United States Patent
Hounsell et al.

(10) Patent No.: US 10,127,609 B2
(45) Date of Patent: Nov. 13, 2018

(54) COMPUTER RUNTIME OPTIMIZATION FOR SYSTEM SUPPORTING ASSET-LEVEL BIDS ON A PORTFOLIO WITH MAXIMUM AND MINIMUM CONSTRAINTS

(71) Applicant: The Debt Exchange, Inc., Boston, MA (US)

(72) Inventors: Bruce Kenneth Hounsell, Boston, MA (US); Sofia Valentinovna Voulikhman, Newton, MA (US)

(73) Assignee: THE DEBT EXCHANGE, INC., Boston, MA (US)

(*) Notice: Subject to any disclaimer, the term of this patent is extended or adjusted under 35 U.S.C. 154(b) by 510 days.

(21) Appl. No.: 14/868,620

(22) Filed: Sep. 29, 2015

(65) Prior Publication Data
US 2016/0092980 A1    Mar. 31, 2016

Related U.S. Application Data

(60) Provisional application No. 62/057,635, filed on Sep. 30, 2014.

(51) Int. Cl.
*G06Q 30/00* (2012.01)
*G06Q 30/08* (2012.01)
*G06Q 40/06* (2012.01)

(52) U.S. Cl.
CPC ............. *G06Q 30/08* (2013.01); *G06Q 40/06* (2013.01)

(58) Field of Classification Search
CPC .............................. G06Q 30/08; G06Q 40/06
See application file for complete search history.

(56) References Cited

U.S. PATENT DOCUMENTS

| 7,225,152 B2 * | 5/2007 | Atkinson | G06Q 30/08 705/37 |
| 7,627,510 B2 * | 12/2009 | Jain | G06Q 30/06 705/26.3 |
| 7,870,054 B2 * | 1/2011 | Abeshouse | G06Q 30/0641 705/26.3 |

(Continued)

OTHER PUBLICATIONS

Preston McAfee et al. "Auctions and Bidding" Journal of Economic Literature vol. XXV (Jun. 1987), pp. 699-738. (Year: 1987).*

(Continued)

*Primary Examiner* — Naeem U Haq
(74) *Attorney, Agent, or Firm* — RatnerPrestia

(57) ABSTRACT

An Optimization Server reduces M×N iteration space using various techniques to enhance computer performance by improving computer runtime and memory usage. The Optimization Server determines an aggregate combination of bids that results in high proceeds on individual assets of a portfolio subject to minimum and maximum constraints imposed by a bidder across a plurality of individual asset bids. The Optimization Server stores in a memory a portfolio array including M number of elements. Each portfolio array element corresponds to a bid array of bids on the plurality of individual assets of the portfolio. Each bid array includes N number of elements and each bid array element corresponds to a bid amount on one of the plurality of individual assets in the portfolio. The bid array also includes a corresponding minimum constraint and a corresponding maximum constraint across all of the individual asset-level bids placed on the portfolio.

20 Claims, 12 Drawing Sheets

(56) References Cited

U.S. PATENT DOCUMENTS

| | | | |
|---|---|---|---|
| 8,086,518 B1* | 12/2011 | Maor | G06Q 30/08 705/37 |
| 8,126,794 B2* | 2/2012 | Lange | G06Q 30/08 705/36 R |
| 2004/0111358 A1* | 6/2004 | Lange | G06Q 40/04 705/37 |

OTHER PUBLICATIONS

Paul Klemperer, "Auctions: Theory and Practice" © 2004 Princeton University Press, pp. 1-5. (Year: 2004).*

Paul R. Milgrom et al. "A Theory of Auctions and Competitive Bidding" Technical Report No. 358, Dec. 1981, Standford University (Year: 1981).*

Michael H. Rothkopf et al. "Modeling Competitive Bidding: A Critical Essay" Management Science/vol. 40, No. 3, Mar. 1994, pp. 364-384. (Year: 1994).*

* cited by examiner

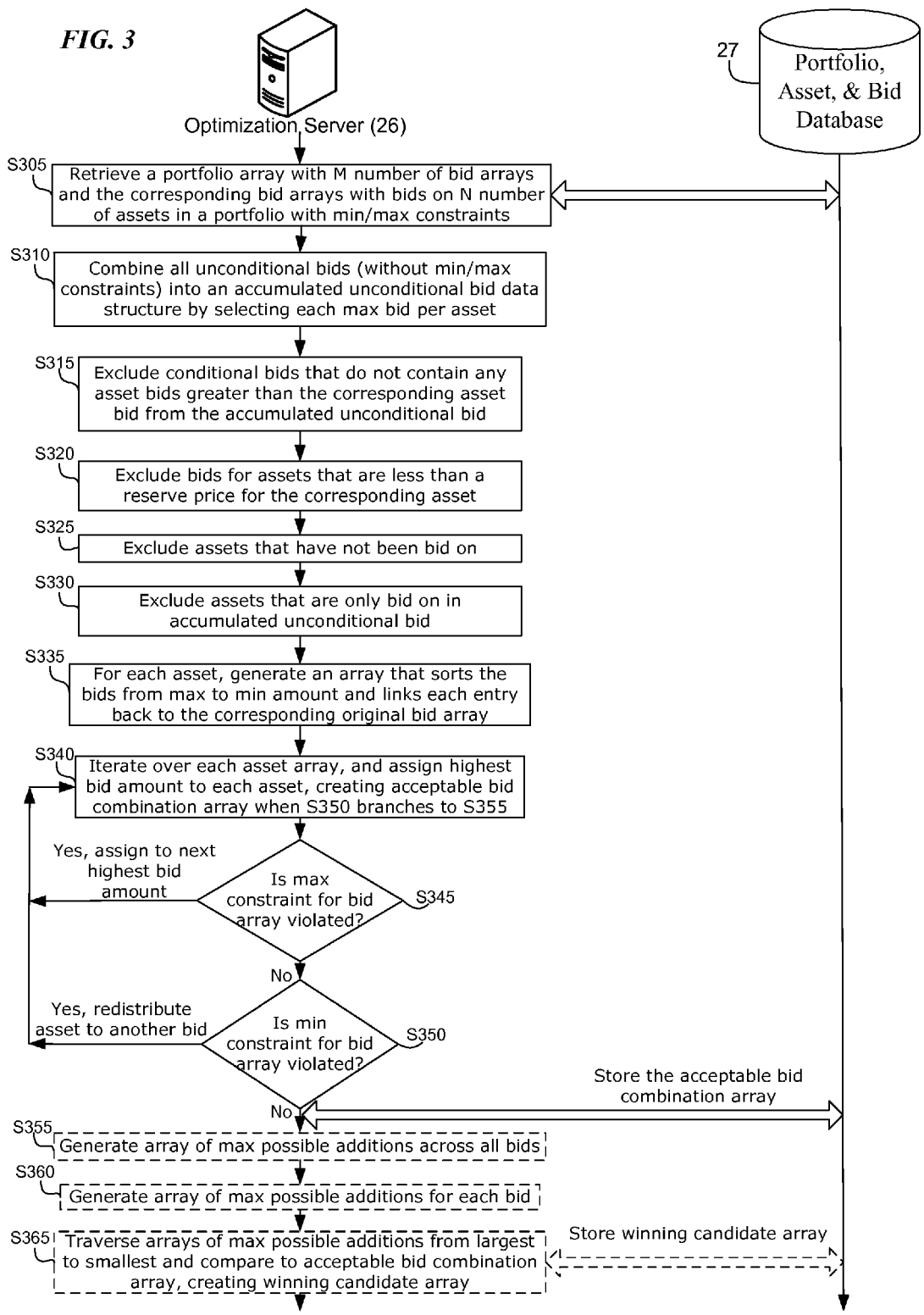

FIG. 4A (400)

| | Asset 1 | Asset 2 | Asset 3 | Asset 4 | Asset 5 | ... | Asset N | Min | Max |
|---|---|---|---|---|---|---|---|---|---|
| Bid 1 | 5 | 4 |  | 4 | 3 | ... | 3 | None | 5 |
| Bid 2 |  |  | 2 | 3 |  | ... | 3 | 2 | 8 |
| Bid 3 | 3 | 2 |  |  |  | ... |  |  |  |
| Bid 4 |  | 2 |  |  | 4 | ... |  |  |  |
| Bid 5 | 2 |  |  | 5 |  | ... |  | 2 |  |
| ... |  |  |  |  |  | ... |  |  |  |
| Bid M |  | 4 | 3 |  |  | ... | 5 |  |  |

| | Min | Max | Asset 1 | Asset 2 | Asset 3 | Asset 4 | Asset 5 | Asset 6 | Asset 7 |
|---|---|---|---|---|---|---|---|---|---|
| Bid 1 | none | none | 24 | 25 | 35 | 45 |  | 65 | 85 |
| Bid 2 | none | 200 | 27 | 27 | 33 | 46 | 50 | 69 |  |
| Bid 3 | 65 | 200 |  |  | 37 |  | 59 | 70 |  |
| Bid 4 | 150 | none | 22 | 22 |  | 44 |  | 78 |  |
| Bid 5 | 110 | none | 26 | 26 | 34 |  | 53 | 79 |  |
| Bid 6 | none | none | 25 | 25 | 33 | 44 |  |  | 82 |
| Bid 7 | none | none |  | 35 |  |  | 59 | 70 | 84 |
| Bid 8 | 50 | 150 | 24 | 24 | 30 | 42 | 64 | 69 | 82 |

| | Min | Max | Asset 1 | Asset 2 | Asset 3 | Asset 4 | Asset 5 | Asset 6 |
|---|---|---|---|---|---|---|---|---|
| Bid A | none | none |  | 25 | 35 | 45 | 65 | 72 |
| Bid 2 | none | 200 | 200 | 27 | 33 | 46 | 50 | 69 |
| Bid 3 | 65 |  | 200 |  | 37 |  | 59 | 70 |
| Bid 4 | 150 | none |  | 22 |  | 44 |  | 55 | 78 |
| Bid 5 | 110 | none |  | 26 | 34 |  | 53 | 0 | 79 |

|  | Min | Max | Asset 6 | Asset 5 | Asset 4 | Asset 3 | Asset 2 | Asset 1 |
|---|---|---|---|---|---|---|---|---|
| Bid A | none | none | 72 | 65 |  | 45 | 35 | 25 |
| Bid 2 | none | 200 | 69 |  | 50 | 46 | 33 | 27 |
| Bid 3 | 65 | 200 | 70 | 62 | 59 |  |  | 37 |
| Bid 4 | 150 | none | 78 | 55 |  | 44 |  | 22 |
| Bid 5 | 110 | none | 79 |  | 53 |  | 34 | 26 |

FIG. 4E

| Asset 6 | Asset 5 | Asset 4 | Asset 3 | Asset 2 | Asset 1 |
|---|---|---|---|---|---|
| 79 Bid 5 | 65 Bid A | 59 Bid 3 | 46 Bid 2 | 37 Bid 3 | 27 Bid 2 |
| 78 Bid 4 | 62 Bid 3 | 53 Bid 5 | 45 Bid A | 35 Bid A | 26 Bid 5 |
| 72 Bid A | 55 Bid 4 | 50 Bid 2 | 44 Bid 4 | 34 Bid 5 | 25 Bid A |
| 70 Bid 3 |  |  |  | 33 Bid 2 | 22 Bid 4 |
| 69 Bid 2 |  |  |  |  |  |

FIG. 4F

|  | Min | Max | Asset 6 | Asset 5 | Asset 4 | Asset 3 | Asset 2 | Asset 1 | Total |
|---|---|---|---|---|---|---|---|---|---|
| Bid A | none | none |  | 65 |  |  |  |  | 65 |
| Bid 2 | none | 200 |  |  |  | 46 |  | 27 | 73 |
| Bid 3 | 65 | 200 |  |  | 59 |  | 37 |  | 96 |
| Bid 4 | 150 | none |  |  |  |  |  |  |  |
| Bid 5 | 110 | none | 79 |  |  |  |  |  | 79 Less than minBid (110) |

FIG. 4G

|  | Min | Max | Asset 6 | Asset 5 | Asset 4 | Asset 3 | Asset 2 | Asset 1 | Total |
|---|---|---|---|---|---|---|---|---|---|
| Bid A | none | none |  | 65 |  |  |  |  | 65 |
| Bid 2 | none | 200 |  |  |  | 46 |  | 27 | 73 |
| Bid 3 | 65 | 200 |  |  | 59 |  | 37 |  | 96 |
| Bid 4 | 150 | none | 78 |  |  |  |  |  | 78 Less than minBid (150) |
| Bid 5 | 110 | none |  |  |  |  |  |  |  |

FIG. 4H

| | Min | Max | Asset 6 | Asset 5 | Asset 4 | Asset 3 | Asset 2 | Asset 1 | Total |
|---|---|---|---|---|---|---|---|---|---|
| Bid A | none | none | 72 | 65 | | | | | 137 |
| Bid 2 | none | 200 | | | | 46 | | 27 | 73 |
| Bid 3 | 65 | 200 | | | 59 | | 37 | | 96 |
| Bid 4 | 150 | none | | | | | | | |
| Bid 5 | 110 | none | | | | | | | |
| | | | | | | | | Total: | 306 |

FIG. 4I

| Asset 6 | Asset 5 | Asset 4 | Asset 3 | Asset 2 | Asset 1 |
|---|---|---|---|---|---|
| 313 | 234 | 169 | 110 | 64 | 27 |

FIG. 4J

| | Asset 6 | Asset 5 | Asset 4 | Asset 3 | Asset 2 | Asset 1 |
|---|---|---|---|---|---|---|
| Bid A | 242 | 170 | 105 | 105 | 60 | 25 |
| Bid 2 | 225 | 156 | 156 | 106 | 60 | 27 |
| Bid 3 | 228 | 158 | 96 | 37 | 37 | |
| Bid 4 | 199 | 121 | 66 | 66 | 22 | 22 |
| Bid 5 | 192 | 113 | 113 | 60 | 60 | 26 |

465

| | Min | Max | Item 6 | Item 5 | Item 4 | Item 3 | Item 2 | Item 1 | Total |
|---|---|---|---|---|---|---|---|---|---|
| Bid A | none | none | | 65 | | | 35 | | 100 |
| Bid 2 | none | 200 | | | | 46 | | 27 | 73 |
| Bid 3 | 65 | 200 | | | | | | | |
| Bid 4 | 150 | none | | | 53 | | | | 132 |
| Bid 5 | 110 | none | 79 | | | | | | |
| | | | | | | | | Total: | 305 |

| | Min | Max | Asset 6 | Asset 5 | Asset 4 | Asset 3 | Asset 2 | Asset 1 | Total |
|---|---|---|---|---|---|---|---|---|---|
| Bid A | none | none | | 65 | 50 | | | | |
| Bid 2 | none | 200 | | | | | | | |
| Bid 3 | 65 | 200 | | | | | | | |
| Bid 4 | 150 | none | | | | | | | |
| Bid 5 | 110 | none | 79 | | | | | | |

| | Min | Max | Asset 6 | Asset 5 | Asset 4 | Asset 3 | Asset 2 | Asset 1 | Total |
|---|---|---|---|---|---|---|---|---|---|
| Bid A | none | none | | | | | | | |
| Bid 2 | none | 200 | | | | 46 | | 27 | 73 |
| Bid 3 | 65 | 200 | | 62 | 59 | | | | 121 |
| Bid 4 | 150 | none | | | | | 34 | | 113 |
| Bid 5 | 110 | none | 79 | | | | | | |
| | | | | | | | | Total: | 307 |

| | Min | Max | Asset 6 | Asset 5 | Asset 4 | Asset 3 | Asset 2 | Asset 1 | Total |
|---|---|---|---|---|---|---|---|---|---|
| Bid A | none | none | | | | 45 | | | 45 |
| Bid 2 | none | 200 | | | | | | 27 | 27 |
| Bid 3 | 65 | 200 | | 62 | 59 | | | | 121 |
| Bid 4 | 150 | none | | | | | 34 | | 113 |
| Bid 5 | 110 | none | 79 | | | | | | |
| | | | | | | | | | 306 |

| | Min | Max | Asset 1 | Asset 2 | Asset 3 | Asset 4 | Asset 5 | Asset 6 | Asset 7 | Total |
|---|---|---|---|---|---|---|---|---|---|---|
| Bid 1 | none | none | 24 | 32 | 45 | | 65 | 72 | 85 | 85 |
| Bid 2 | none | 200 | 27 | 33 | 46 | 50 | | 69 | | 73 |
| Bid 3 | 65 | 200 | | 37 | | 59 | 62 | 70 | | 121 |
| Bid 4 | 150 | none | 22 | | 44 | | 55 | 78 | | |
| Bid 5 | 110 | none | 26 | 34 | | 53 | 0 | 79 | | 113 |
| Bid 6 | none | none | 25 | 33 | 44 | | 63 | | 82 | |
| Bid 7 | none | none | | 35 | | | 59 | 70 | 84 | |
| Bid 8 | 50 | 150 | 24 | 30 | 42 | | 64 | 69 | 82 | |
| | | | | | | | | | Total: | 392 |

485

| Inventory | DebtXData | Pool | | Search |
|---|---|---|---|---|
| Summary \| Documents \| Bids | | | Select a Deal... | Go |

Hypothetical Pool 2
66 assets totaling $ 2,947,523
Sealed Bid [            ]

Inquiries: [        ] SPONSORED BY
(about) DebtX

Auction Status

| Auction Type: | Sealed Bid |
|---|---|
| Auction Opens: | |
| Auction Closes: | |
| Time Zone: | (GMT-05:00) Eastern Time (US & Canada) |

Frequently Asked Questions
- How do I submit a bid?
- What is an Assigned Bid Percentage?
- What is a Bid Identification Number?
- Why isn't my Bid being accepted?
- What is an Aggregate Offering?
- How do individual and aggregate bids interact?

710 → Multi Pool Bids with MinMax

Individual Bids | Combination Bids

Minimum Award Amount: $1,000,000
Maximum Award Amount: $5,000,000

740

Submit Individual Bid(s)
☐ Default Multi-View

Individual Bid(s)

| All | Contin gency | Pool | | As Of | Principal Balance | Bid as % of Principal | Bid Amount |
|---|---|---|---|---|---|---|---|
| ☑ | ☐ | Hypothetical Pool 2: | 66 Assets | | $2,925,155.37 | 70.00000% | $2,047,608.76 |
| ☑ | ☐ | Hypothetical Pool 3: | 34 Assets | | $3,315,130.31 | 80.00000% | $2,652,104.25 |
| ☑ | ☐ | Hypothetical Pool 4: | 17 Assets | | $1,121,134.99 | 60.00000% | $672,680.99 |

720

730

☐ I have read, understand and agree to all of the terms and conditions of the Terms Of Sale Memorandum.
I am submitting 3 individual bid(s)

[ Place Bid(s) ] [ Reset ]

COMPUTER RUNTIME OPTIMIZATION FOR SYSTEM SUPPORTING ASSET-LEVEL BIDS ON A PORTFOLIO WITH MAXIMUM AND MINIMUM CONSTRAINTS

CROSS REFERENCE TO RELATED APPLICATION

This application claims priority to U.S. Provisional Application No. 62/057,635, filed on Sep. 30, 2014, titled "Computer Runtime Optimization for System Supporting Asset-Level Bids on a Portfolio with Maximum and Minimum Constraints," which is incorporated by reference in its entirety as if fully disclosed herein.

BACKGROUND

"O" represents Big-O notation. Big-O notation is used to articulate how long an algorithm takes to run, and is used to compare the efficiency of different computer processing solutions to a problem. With Big-O notation, the runtime is expressed in terms of how quickly the runtime grows relative to the input.

Generally described, an array is an arrangement (e.g., a data structure) of items at equally spaced addresses in computer memory. For example, an array data type is used in a computer programming language to specify a variable that can be indexed at runtime. A linked list is a data structure that represents a group of nodes which together represent a sequence and the needed memory is typically allocated while a computer program is running.

Assume a first computing array (or first linked list) is of size N and each element of the first computing array is a second array (or second linked list) of size M. As N and M grow, iterating over the N×M iteration space will quickly exceed the cache size of a computer, driving up the runtime, and take up significant memory. Algorithms with a runtime of $O(M^N)$ are particularly problematic for a computer to process in a timely manner.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 is a flow chart of a procedure for determining a high aggregate combination of individual bids on the assets of the portfolio/pool with optimized computer performance.

FIG. 4A is an example of a bid set for an auction, where each bid is represented as a data structure (e.g., bid array) of separate individual bids on individual assets of a portfolio/pool with maximum and minimum constraints.

FIG. 4B is an example of an initial problem space table with eight bid arrays, where each bid array includes a minimum constraint, a maximum constraint, and separate bids on assets of a portfolio/pool.

FIG. 4C is an example of a reduced problem space table generated during steps of FIG. 3.

FIG. 4D is an example of re-ordered assets in the bid arrays by the maximum bid amount per asset generated during steps of FIG. 3.

FIG. 4E is an example of a set of sorted asset arrays with linked original bid array information 432 that is generated during steps of FIG. 3.

FIG. 4F is an example of an unacceptable solution to the problem space of FIG. 4B, where a bid array is in violation of the minimum constraint of the respective bid array.

FIG. 4G is another example of an unacceptable solution to the problem space of FIG. 4B, where another bid array is in violation of the minimum constraint of the respective bid array.

FIG. 4H is an example of an acceptable solution to the problem space of FIG. 4B.

FIG. 4I is an example of a maximum possible additions across all bids array that is generated during step S355 of FIG. 3.

FIG. 4J are examples of maximum possible additions per bid arrays that are generated during step S360 of FIG. 3.

FIGS. 4K-O are examples of data structures, arrays, and solutions to the problem space of FIG. 4B, which are generated during step S365 of FIG. 3.

FIG. 7 is graphical user interface of bidding functionality that enables bidding on multiple pools with minimum and maximum constraints from a bidder's perspective.

DETAILED DESCRIPTION

Figure 1:
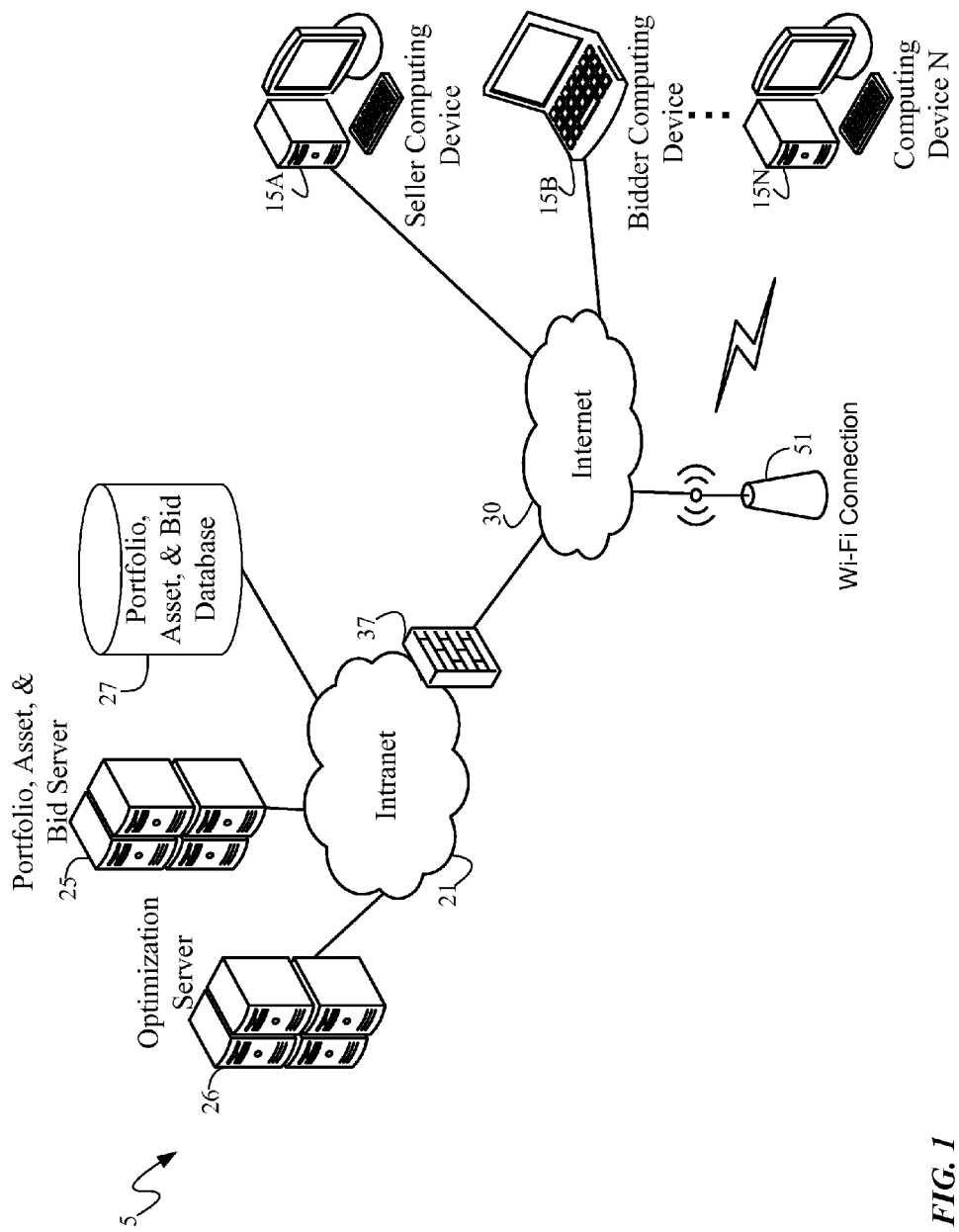
FIG. 1 is a high-level functional block diagram of an example of a system of networks and devices that provide a variety of communication services, including communications in support of optimizing the computer runtime for determining high aggregate bidding results on a portfolio/pool of assets.

In the current marketplace, a bidder is often forced to bid on an asset portfolio or pool that bundles individual assets (e.g., loans) together at a portfolio/pool level instead of at the individual asset level. Conventional systems allow the offline submission of non-conforming bids to an individual asset within the portfolio, but processing of the bids is manually done. Neither of these strategies is efficient from a bidding standpoint, nor does it provide a seller of the portfolio with the most profitable bidding results.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In the discussion herein, a portfolio is comprised of at least one pool. The pools, in turn, include a plurality of assets. To simplify the discussion below, when the portfolio is comprised of a single pool, the assets are described as being part of the portfolio without reference to the pool because the portfolio and pool are one and the same.

Even if one were to implement a computerized system that allows bidding on individual assets within the portfolio/pool, the computer runtime of such a system grows linearly as the number of assets in the portfolio/pool and bids increase. Assume a portfolio includes N number of assets. Now assume that M number of bids have been placed on each of the assets in the portfolio/pool. The runtime to determine the most profitable bid results is at least O(N×M), where "O" represents Big-O notation. As N and M grow, iterating over the N×M iteration space will quickly exceed the cache size of the computer, driving up the runtime, and take up significant memory.

In the prior solutions, bidders are typically required to place binding bids across any pools that interest them at the same time, and before they are informed that they are the winner of any pools. Unfortunately, bidders have a limited amount of capital available to purchase pools in a portfolio sale. Since they are contractually obligated to close on any and all pools that are awarded, bidders generally loathe submitting bids on more pools than their financial capacity allows. This means bidders may not place a bid on a pool on which they could have been the high bidder.

To encourage the bidder to bid on more assets than the bidder has the financial capacity to purchase, and provide the seller with the ability to award the most favorable bids within the bidder's constraints, the present solution allows a bidder to impose a maximum constraint purchase amount across all asset-level bids placed by the bidder. To further encourage the bidder to participate in a particular auction, the present solution also allows the bidder to impose a minimum constraint to prevent the bidder from being awarded a de minimis purchase amount.

Unfortunately, it has been discovered that when a bidder imposes such maximum and minimum constraints to dictate the maximum and minimum amounts that the bidder is willing to pay for any subset of assets within the portfolio, the runtime is driven up dramatically. When the maximum and minimum constraints are provided, the runtime may reach $O(M^N)$. The existing technology also fails to provide an optimized algorithm that determines a highly profitable asset-level bid combination within a reasonable computer execution time.

Accordingly, even if a computerized solution that allowed asset-level bidding within a loan portfolio were achieved, the performance of the computer would be sub-optimal. Consequently, there are many drawbacks to existing technology.

Reference now is made in detail to the examples illustrated in the accompanying drawings and discussed below. FIG. 1 illustrates a functional block diagram of a system 5 that supports communications for optimizing the computer runtime of achieving high aggregate bidding results on a portfolio/pool of assets. In FIG. 1, a plurality of parties, including bidders and sellers, participate on a plurality of respective computing devices 15A-N in a sealed bid, online auction.

In FIG. 1, bidders use a respective bidding computing device 15B to enter separate bids on individual assets of a portfolio/pool via a webpage that is generated by Portfolio, Asset, & Bid Server 25. When placing a bid, the bidder may indicate the minimum or maximum currency amount that the bidder is willing to spend across all bids on the assets of the portfolio/pool. In other words, the minimum and maximum constraints control the maximum and minimum amounts the bidder is willing to pay for any subset of assets in the portfolio/pool.

The Portfolio, Asset, & Bid Server 25 stores the received bids in the Portfolio, Asset, & Bid Database 27 for processing by the Optimization Server 26. The Optimization Server 26 enables the seller of the portfolio/pool to determine the optimal combination of bids that results in high proceeds. Portfolio, Asset, & Bid Server 25 also allows the seller to enter and evaluate the bids based on specific reserve prices that impose a minimum bid amount that the seller is willing to accept for an individual asset or portfolio/pool. Such a reserve price is used in the sell/hold decision of the seller and enhances the seller's flexibility in determining which assets or portfolio/pool to hold and sell.

In our discussion, the computing devices 15A-N and servers 25, 26 use packet communications via an Intranet 21 (e.g., a secure local area network), and the Internet 30 (e.g., a wide area network), which typically would utilize packet transport and Internet Protocol ("IP"). Intranet 21 may be a secure communication data network that is coupled to the Portfolio, Asset, & Bid Server 25 and the Optimization Server 26 to provide communications for the Portfolio, Asset, & Bid Server 25 and the Optimization Server 26, including communications between the Portfolio, Asset, & Bid Server 25 and the Optimization Server 26.

Data communications via Internet 30 with network connected equipment, provided for a bidder or seller that is using computing devices 15A-N, may support a variety of services, such as communications of text and multimedia messages, e-mail, web browsing, streaming or downloading content, etc. The Intranet 21 is connected to the Internet 30 via routing and protective gear generally represented by the firewall 37. Firewall 37 is coupled to the Intranet 21 to provide a communication gateway to the Internet 30 serving the seller computing device 15A and the plurality of bidder computing devices 15B-N that are configured as clients of one or both of the Portfolio, Asset, & Bid Server 25 and the Optimization Server 26.

As shown, system 5 includes a plurality of computing devices 15A-N that communicate over the Internet 30, shown as a personal computer ("PC"), a laptop computer, and a PC, respectively. The computing devices 15A-N can also be a tablet computer, a smartphone, a personal digital assistant ("PDAs"), a portable game or media player with wireless communication elements, or other portable devices designed to communicate via one or more wireless networks, including packet-switched transport networks. Computing devices 15A-N may wirelessly connect to the Internet 30 via through a WiFi connection 51 to communicate, one of which appears in the drawing by way of example. Alternatively, computing devices 15A-N may communicate via wired media.

In our illustration, the computing devices 15A-N engage in communications with the Portfolio, Asset, & Bid Server 25 and Optimization Server 26. The computing devices 15A-N are used by sellers and bidders to makes service calls, such as by way of Hypertext Transfer Protocol ("HTTP"), when interacting with the web pages generated by the Portfolio, Asset, & Bid Server 25 and the Optimization Server 26 to structure a portfolio/pool sale which allows bidders to select specific assets to bid on, in order to maximize the total proceeds from the portfolio/pool sale. Consequently, system 5 maximizes the price of the overall portfolio/pool for the seller as each and every asset of the portfolio is awarded to the highest bidder, subject to the minimum/maximum constraints inputted by the bidder.

Computing devices 15A-N and servers 25, 26 have a network communication capability and one or more physical elements for providing a user interface. Internally, computing devices 15A-N and servers 25, 26 typically include one or more wired or wireless transceivers for data communication, a processor configured/connected to control device operation, a memory, and programming. As discussed more later, computing devices 15A-N and servers 25, 26 also include one or more physical elements for input, and are programmed or otherwise configured to perform various functions involved in the system 5 supporting asset-level bids on a portfolio/pool with maximum and minimum constraints, determining high aggregate bidding results on the portfolio/pool, and optimizing the computer performance characteristics of the high aggregate bidding results determination.

The Portfolio, Asset, & Bid Server 25 and Optimization Server 26 as outlined above may be merged with each other or divided into further devices and servers despite their logical and physical organization in the illustration. For example, the collective functionality of Portfolio, Asset, & Bid Server 25 and Optimization Server 26 may be embodied in a single server or as two separate and distinct devices. Alternatively, either server or a combined server for both functions may be implemented as multiple instances on network connected computers, e.g., in server farms.

In our example, the Portfolio, Asset, & Bid Database 27 is contained in a non-transitory storage device accessible to a first processor of the Portfolio, Asset, & Bid Server 25 and a second processor of the Optimization Server 26. Portfolio, Asset, & Bid Database 27 comprises a database structure for first communication data indicating a portfolio having a plurality of individual assets for sale from the seller computing device 15A and a second communication data indicating a bid from each of the plurality of bidder computing devices 15B-N.

Figure 2:
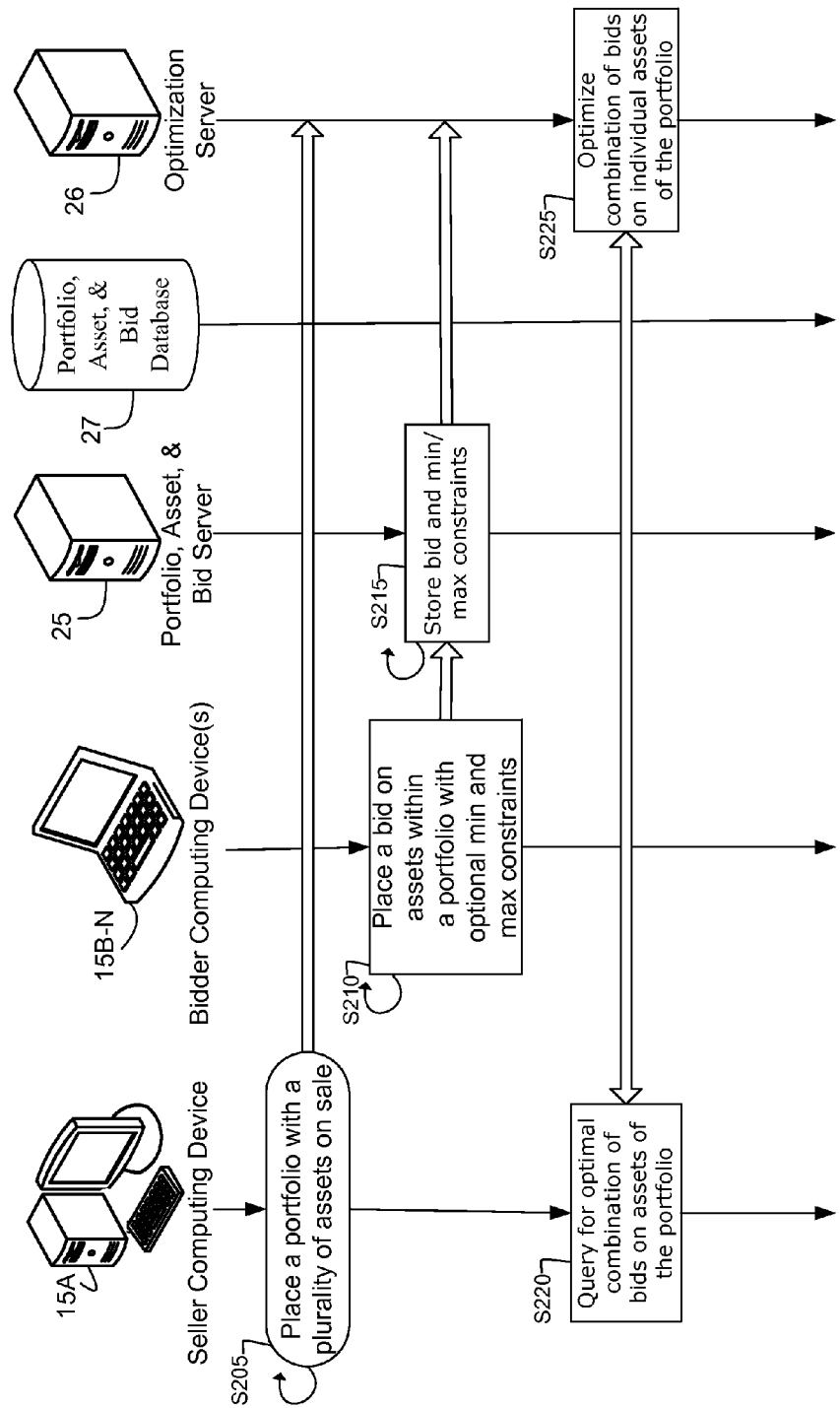
FIG. 2 is a flow chart of a procedure for bidding on individual assets within a portfolio/pool and then determining a combination of the bids on individual assets of the portfolio that generates high proceeds for the portfolio/pool.

FIG. 2 illustrates a procedural flow for bidding on individual assets within a portfolio/pool and then determining a combination of the bids on individual assets of the portfolio that generates high proceeds for the portfolio/pool. In the illustrated example, the computing devices 15A-N are in communication with the Portfolio, Asset, & Bid Server 25 and the Optimization Server 26 through the Internet 30.

To initiate the procedure, in step S205, a seller computing device 15A is used by a seller to place a portfolio/pool with a plurality of assets on sale. Of note, the seller computing device 15A is not limited to a device that is used by an owner of the portfolio with the plurality of assets that are being placed on sale. Rather, the seller computing device 15A encompasses a computing device that may also be used by a system administrator or portfolio manager to set up the sale of the portfolio with the plurality of assets. Accordingly, the seller may be a portfolio owner, system administrator, or manager of the portfolio. As part of the communications during the portfolio sale process, computing device 15A may transmit data indicating the selected assets that are being placed on sale, an optional reserve price, and optional minimum or maximum constraints to control the portfolio/pool/asset sale. As shown, step S205 is iterative as the seller computing device 15A can place individual assets of one or more portfolios/pools on sale. The portfolio selection and setup sale process may be placed and indicated to the Portfolio, Asset, & Bid Server 25 using a service request via extensible markup language ("XML"), HTTP, or an application programing interface ("API"), for example.

Figure 6:
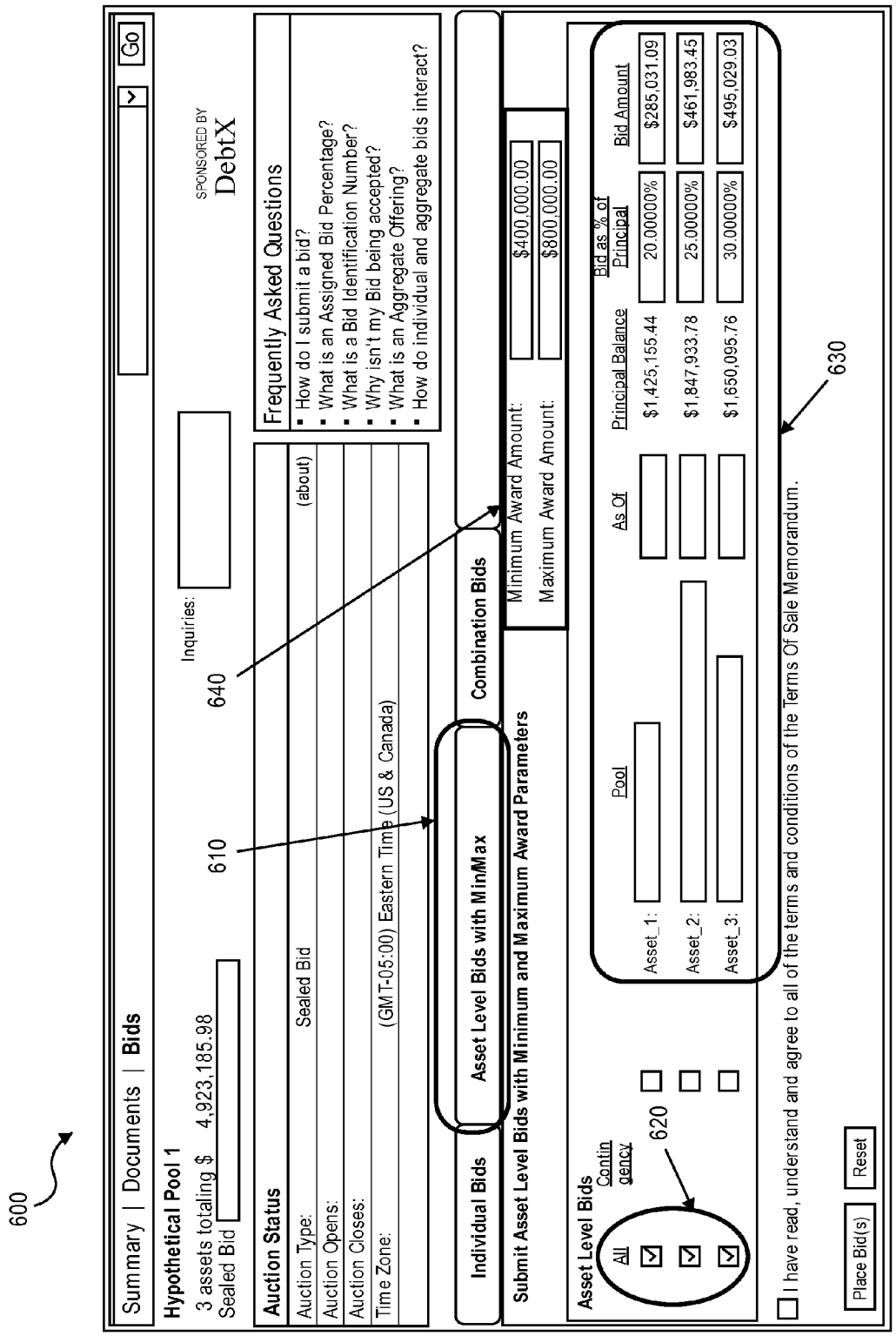
FIG. 6 is a graphical user interface of bidding functionality that enables asset-level bids on a portfolio/pool with minimum and maximum constraints from a bidder's perspective.

In step S210, computing devices 15B-N initiate communication with the Portfolio, Asset, & Bid Server 25 through a web browser and, in return, are sent a webpage listing of assets of a portfolio/pool to place bids on. Exemplary graphical user interfaces of the generated web pages that are sent from the Portfolio, Asset, & Bid Server 25 are shown in FIGS. 6-7, which are discussed in further detail below. During the communications exchanged with Portfolio, Asset, & Bid Server 25, bidders use computing devices 15B-N to place bids on a plurality of assets within a portfolio at the asset-level via HTTP, for example.

As part of the communications during the bid process, bidder computing devices 15B-N transmit data indicating the selected assets that are being bid on, bid amount, and minimum or maximum constraints to control the individual asset bids at the portfolio/pool level. By introducing the maximum and minimum constraints, the bidder limits the purchase amount across all assets of the portfolio/pool that are bid on to the amount specified. By introducing a minimum constraint, the bidder specifies a minimum purchase amount across all assets of the portfolio/pool. As shown, step S210 is iterative as each of a plurality of computing devices 15A-N can place one or more bids on individual assets of a portfolio/pool. The bid selection may be placed and indicated to the Portfolio, Asset, & Bid Server 25 using a service request via extensible markup language ("XML"), HTTP, or an application programing interface ("API"), for example.

Moving now to step S215, upon receiving each of the bids from the computing devices 15B-N, the Portfolio, Asset, & Bid Server 25 stores each of the bids and any minimum and maximum constraints that are imposed in the Portfolio, Asset, & Bid Database 27.

Continuing now to block S220, after asset-level bids on the portfolio/pool are placed by a plurality of bidders via computing devices 15B-N, a seller queries the Optimization Server 26 for the combination of bids that generate high aggregate bid results on the portfolio/pool via a computing device 15A. The query service call from the seller's computing device 15A may be made directly to the Optimization Server 26 or to the Portfolio, Asset, & Bid Database 27 which, in turn, redirects that service request to the Optimization Server 26. As a parameter in the service request, the seller's computing device 15A transmits the identifier of the portfolio/pool to the Optimization Server 26 as a parameter in a HTTP, XML, or an API request, for example.

Proceeding now to step S225, the Optimization Server 26 receives the service request to determine the combination of the bids on individual assets of the portfolio that generate high proceeds for the portfolio/pool. The Optimization Server 26 queries accessible databases, such as Portfolio, Asset, & Bid Database 27, which includes bids placed on the individual assets of the portfolio during step S210. Upon retrieving the relevant data structures, the Optimization Server 26 determines the combination of bids on the portfolio/pool that results in high proceeds for the seller using the optimized steps outlined in the discussion of FIG. 3 below, for example. Subsequently, the high aggregate results are transmitted back to the seller computing device 15A.

In one example of step S225 and referring now table 400 of FIG. 4A, the Optimization Server 26 determines the highest aggregate combination of bids using a so-called "brute-force" approach. The table 400 of FIG. 4A, represents a bid set on a portfolio for an auction. The portfolio being auctioned contains N number of assets 401 and M number of bids 402, where each bid is represented as a data structure (e.g., an array or linked list) of individual bids on the N number of assets 401 with optional minimum and maximum constraints. As shown in the table 400, some bids 402 have a minimum constraint, a maximum constraint, or both. On the other hand, some bids 402 do not impose any minimum or maximum constraints.

Optimization Server 26 starts in the upper left corner of the table 400 of FIG. 4A and iterates through the asset 1 bids in bid arrays 402, initially assigning asset 1 to bid 1. Optimization Server 26 checks if the bid 1 array has a maximum constraint that is less than the bid placed on asset 1 by the bid 1 array to ensure there is no maximum constraint violation. Were there such a violation (which there is not in the example), the Optimization Server 26 would iteratively try to assign asset 1 to the successive bid arrays until there is no maximum constraint violation.

Optimization Server 26 continues to iterate through the bid 1 array, and next assigns asset 2 to bid 1. At this point, the maximum constraint for the bid 1 array is again checked for violations. If there is no violation of the maximum constraint of the bid 1 array, asset 2 will be assigned to bid 1. If there is such a violation (which there is), Optimization Server 26 assigns asset 2 to the bid 2 array, provided the bid 2 array actually includes a bid on asset 2. In the bid set in the table 400, Optimization Server 26 finds that asset 2 is not included as a bid in the bid 2 array, so Optimization Server 26 examines the bid 3 array next for a bid on asset 2 and a maximum constraint violation. Since there are no violations, Optimization Server 26 places asset 2 with the bid 3 array.

Optimization Server 26 next processes asset 3 from the bid 1 array. At some point, when asset N is reached, Optimization Server 26 checks the combination of aggregate bids for feasibility. In other words, Optimization Server 26 checks whether all bids included in the combination of aggregate bids data structure (e.g., an array or linked list) violate respective minimum and maximum constraints of bid arrays 402. Because maximum constraints were checked throughout the process, Optimization Server 26 checks the minimum constraints of each bid array 402.

If none of the minimum constraints are violated, Optimization Server 26 has a current acceptable bid combination in the aggregate bids data structure. On the other hand, if there is a minimum constraint violation, Optimization Server 26 assigns asset N to the next successive bid array number. For example, if asset N is assigned to the bid 1 array, Optimization Server 26 assigns asset N to the bid 2 array instead, and then checks the minimum constraint of the bid 2 array for a violation. If asset N was assigned to bid M array and there is minimum constraint violation, then the Optimization Server 26 backtracks, assigning asset N to each of the preceding bids 1 to M-1 arrays, and checking which bid array 402 results in the highest aggregate bid results.

Optimization Server 26 processes each of the array for bids 2 . . . M in a similar manner as the bid 1 array until bid M is reached. As the Optimization Server 26 processes each bid array and reaches asset N of the respective bid array, the aggregate result (i.e., sum of bid assignments) is checked against the current acceptable bid combination to determine which has the higher total proceeds. If the new aggregate result is higher than the current acceptable bid combination, then the Optimization Server 26 replaces the acceptable bid combination with the new bid combination.

The foregoing brute-force algorithm can result in a long runtime. Fortunately, several optimizations can be implemented, as outlined in FIG. 3, to improve the computer performance, as discussed below.

FIG. 3 is a procedural flow for determining a high aggregate combination of individual bids on the assets of the portfolio/pool with optimized computer performance. In the example, the iteration space (M number of bids and N number of assets) is reduced in order to improve the computer runtime and memory usage performance characteristics.

Beginning in step S305, the Optimization Server 26 retrieves a portfolio array (or linked list) and the corresponding bid arrays (or linked lists) from the Portfolio, Asset, & Bid Database 27. The portfolio array includes M number of entries that each correspond to a bid array of bids on the assets of the portfolio/pool. Each bid array includes at least one bid on an individual asset of the portfolio/pool, where there are N number of assets in the portfolio/pool. For illustration purposes, FIG. 4B shows an initial problem space table 405 with eight bid arrays 409, where each bid array 409 includes a minimum constraint 406, a maximum constraint 407, and separate bids on seven assets 408.

Moving now to step S310, the Optimization Server 26 combines all of the unconditional bids into an accumulated unconditional bid data structure (e.g., a linked list or an array) by selecting the maximum bid per asset of the portfolio. An unconditional bid is a bid that has no minimum and maximum constraint imposed. In contrast, a conditional bid is a bid that has either a minimum constraint, a maximum constraint, or both minimum and maximum constraints. Since there are no maximum or minimum constraints on unconditional bids, Optimization Server 26 represents/combines all existing unconditional bids as one unconditional bid array (or linked list) that selects the maximum bid amount of each asset across all of the unconditional bid arrays using a quick sort (i.e., a partition-exchange) routine, for example. The Optimization Server 26 links the entries of this accumulated unconditional bid back to the underlying unconditional bid array and element to represent the problem in terms of the actual bids placed; however, the underlying unconditional bid arrays can be removed from the iteration processing space and replaced with a single accumulated unconditional bid data structure.

Continuing now to step S315, the Optimization Server 26 excludes conditional bid arrays from the iteration space that do not contain any asset bids greater than the corresponding asset bid element from the accumulated unconditional bid array. Since all the bids left are conditional bid arrays, Optimization Server 26 removes a conditional bid from the iteration space if the conditional bid array lacks any asset-levels bids that are greater than the corresponding asset bid amount from the accumulated unconditional bid data structure. This can be achieved by checking each conditional bid array and accumulated unconditional bid data structure against each other element-by-element.

In step S320, the Optimization Server 26 excludes bids that are less than a reserve price for an asset. For example, the seller may impose a reserve amount that specifies a lower bid limit amount which the asset of the portfolio must achieve to be sold. Accordingly, the Optimization Server 26 removes from the iteration space each bid for the asset in the bid arrays that have amounts that are less than the reserve price of the asset. Such below reserve price bids are no longer considered during future processing.

Moving to step S325, the Optimization Server 26 excludes assets that have not been bid on in any of the bid arrays. Optimization Server 26 minimizes the number of assets by checking if there is an asset not included in any of the bid arrays. Such assets can be excluded from processing.

In step S330, Optimization Server 26 checks if there is an asset that is only included in the accumulated unconditional bid array. Such an asset may be excluded from further processing, because that asset must be awarded to the corresponding element and respective bid amount from the accumulated unconditional bid data structure. By applying such logic, the problem set and thus iteration space is reduced.

For illustration purposes, FIG. 4C shows a reduced problem space table 415 generated after steps S310-S330 with five bid arrays 419, including the accumulated unconditional bid array (shown as bid A), where each bid array 419 includes a minimum constraint 416, a maximum constraint 417, and separate bids on six assets 418. As shown, bid arrays 1, 6, and 7 have been combined into accumulated unconditional bid array A in step S310, and bid 8 is excluded in step S315. This reduces the iteration space from the initial size of 7 assets×8 bid arrays to 6 assets×5 bid arrays.

Moving now to step S335, for each asset, the Optimization Server 26 generates a set of asset arrays, each of which is a list that sorts the bids for each corresponding asset from the maximum to minimum amounts (i.e., descending bid order) and links each entry back to the corresponding original bid array. Such cross-referencing information between each asset array and bid array is used after processing to represent the optimization result in the original problem set terms. For illustration purposes, FIG. 4D shows the re-ordered assets in the bid arrays by the maximum bid amount per asset. Note that that there are still five bid arrays 424, including the accumulated unconditional bid array (shown as bid A), where each bid array 424 includes a minimum constraint 421, a maximum constraint 422, and separate bids on six assets 423. FIG. 4E shows the set 430 of sorted asset arrays 431 with linked original bid array information 432 that is generated in step S335.

In step S340, upon generating the set of asset arrays, the Optimization Server 26 iterates over each asset array and assigns the highest bid amount to each asset. This iteration process is discussed in further detail in steps S345 and S350.

As shown in step S345, using the set of asset arrays in descending order that were created in step S335, the Optimization Server 26 iterates through all assets (subject to the exclusions in the previous steps) and attempts to assign the highest bid amount to each asset. The Optimization Server 26 checks if the maximum constraint of the linked bid array is violated. If the maximum constraint for the bid array is violated, the next highest bid is selected. This process is repeated until a bid is found that does not violate the respective bid array's maximum constraint.

In step S350, when each asset in the asset array has been traversed and the maximum bid constraints have been checked, the Optimization Server 26 checks whether the minimum bid constraints of the selected bids from the corresponding bid arrays are violated. If none of the bids have their minimum constraint violated, the process proceeds to step S355 or the procedure may end.

For illustration purposes of the foregoing steps, FIG. 4F shows an unacceptable solution to the problem space 435, where asset six 438 causes bid array five 439 to be in violation of its minimum constraint 436. Subsequently, as shown in table 440 asset six 443 is distributed to bid array four 444 as shown in FIG. 4G. However, as shown in FIG. 4G now bid array four 444 is in violation of its own minimum constraint 441. Consequently, as shown in table 450 of FIG. 4H, asset six 453 is next distributed to bid array A 453 which is not in violation of its minimum constraint 451.

In the above examples, if there are one or more bid arrays that have an asset assigned to the bid array, but did not reach the minimum bid constraint of the bid array, each asset is redistributed to other bids on that asset in bid arrays that can accept the asset. Thus, the Optimization Server 26 sorts the minimum bid constraints of the bid arrays in descending order of shortage, where the shortage is the difference between the minimum bid constraint and the actual amount accumulated by the bid array. Starting with the bid array that has the biggest shortage (i.e., the most difficult to complete to achieve the minimum bid constraint), the Optimization Server 26 iterates through each asset that is assigned to the bid array and goes through the bid amounts in descending order.

For each asset in the bid array, the Optimization Server 26 finds the next largest prospective bid array that can accept the asset. A prospective bid array is assigned the asset provided that adding the asset to the prospective bid array will not violate the prospective bid's maximum constraint. Alternatively, if the prospective bid array is in violation of the prospective bid array's minimum bid constraint, the Optimization Server 26 assigns the asset to the prospective bid array only if such addition is sufficient to remove the prospective bid array from a list of minimum constraint violating bid arrays.

In the end of step S350, an acceptable combination bid data structure, such as an array or linked list (see FIG. 4H), with a reasonably high proceed amount is generated because relatively large bid amounts have been assigned to each asset. Accordingly, the Optimization Server 26 determines a relatively high aggregate combination of individual bids on the assets of the portfolio/pool that achieves optimal computer performance.

The generated acceptable bid combination data structure may be further processed to potentially generate even higher aggregate bid proceeds in optional steps S355, S360, and S365, as discussed below.

In step S355, Optimization Server 26 generates an array (or linked list) of the maximum possible additions across all bid arrays. The maximum possible additions across all bids array lists the sum of maximum bids for asset elements with an index greater or equal to the current asset's index. In other words, the sum of the maximum possible proceeds from the current asset element forward. As shown in the array 455 of FIG. 4I, the maximum possible additions across all bids array 455 includes six asset elements (after applying the pre-processing exclusions in the previous steps).

Next, in step S360, the Optimization Server 26 generates an array of the maximum possible additions for each bid array. The array of maximum possible additions for each bid array includes the sum of bids for asset elements with an index greater or equal to the current asset's index in the bid array. As shown in the table 460 of FIG. 4J, each maximum possible additions per bid array 462 includes six asset elements (after applying the pre-processing exclusions in the previous steps).

In step S365, the set of asset arrays generated in step S335 are traversed by the Optimization Server 26 from the largest to the smallest and compared to the acceptable bid combination array to create a winning candidate array (or data structure or linked list). This winning candidate array is initially set to the acceptable combination bid array. For the Optimization Server 26 to replace the winning candidate array with a different combination, a current combination array (or data structure or linked list) must not violate the minimum and maximum constraints of the bid arrays and provide a higher bid proceed/combination amount.

In other words, during step S365, the Optimization Server 26 checks whether it is possible to exceed the amount generated by the acceptable combination bid array. As the set of asset arrays are iterated over, a current combination array is generated and checked against the max possible additions arrays starting from each asset element. If the sum of the elements of the current combination array amount added to the maximum possible additions array from the current asset element onwards is determined to be less than the amount generated by the elements of the winning candidate array, then the current combination array is discarded because that current combination array cannot yield more than the winning candidate array.

In addition, when the Optimization Server 26 moves to another asset to generate the current combination array, the Optimization Server 26 checks whether that asset is critical to a bid array that is in the current combination array. An asset is critical to a bid array in the current combination array if the bid array reaches a respective minimum constraint of the bid array with the asset, and will not satisfy the minimum constraint of the bid array without that asset. To this end, the Optimization Server 26 generates a list of critical bid arrays for the so-called "critical asset" when building the current combination array. When there is one bid array to which the asset is critical, the bid array is assigned that asset and further processing for that asset in the current combination array terminates, causing the next asset to be processed.

On the other hand, when there is more than one bid array to which an asset is critical, the Optimization Server 26 determines the current combination array is unacceptable because at least one of the bid arrays in the list of critical bid arrays is unable to satisfy a respective minimum constraint without being assigned the critical asset. Accordingly, the Optimization Server 26 backtracks the current combination array to a previously assigned asset (element x-1, where x is the current asset) that is one or more elements before the current asset (element x) and checks if the previous asset is awarded to bid arrays in the list of critical bid arrays.

Optimization Server 26 backtracks to a state of the current combination array where there is no more than one bid array in the list of critical bid arrays. When the previous asset is awarded to more than one bid array in the list of critical bid arrays, the Optimization Server 26 backtracks even further to an even earlier previous asset element (element x-2), and this occurs iteratively, until there is no more than one bid array in the list of critical bid arrays.

While checking for critical asset(s), the Optimization Server 26 creates an adjusted maximum possible additions array to account for the criticality of an asset. This adjusted maximum possible additions array lists the sum of maximum bids for asset elements with an index greater or equal to the critical asset's index. When the critical asset becomes critical to only one bid array, the Optimization Server 26 replaces the maximum amount for the critical asset (element x) in the adjusted maximum possible additions array with the bid on the critical asset from the bid array.

Each time a current combination array is found that exceeds the winning candidate, the winning candidate is reassigned to the current combination array. The sub-steps of S365 terminate when the set of asset arrays are fully traversed or the Optimization Server 26 finds that the adjusted maximum possible additions array indicates that the current winning candidate cannot be exceeded.

In addition, while checking for critical asset(s), the Optimization Server 26 discards the bid arrays in the current combination array that cannot satisfy a respective minimum constraint. Thus, Optimization Server 26 replaces the maximum/highest amount for any critical assets in the adjusted maximum possible additions array with the next highest bid array based on the set of asset arrays generated in step S335. If the sum of the elements of the current combination array amount added to this adjusted maximum possible additions array from the critical asset onwards is determined to be less than the amount generated by the elements of the winning candidate array, then the current combination array is discarded because that current combination array cannot yield more than the winning candidate array.

For illustration purposes, FIG. 4K shows an alternative solution to the problem space 435 of FIG. 4B. As shown in table 465, the proceeds of the current combination array is 305, which does not exceed the winning combination array's initial assignment to the acceptable bid combination array which has proceeds of 306. Thus, the winning candidate array's assignment to the acceptable bid combination array will not be changed.

To demonstrate the backtracking and criticality sub-steps described in step S365 above, FIGS. 4L-M show another alternative solution to the problem space 435. As shown in tables 470 and 475, the proceeds of the current combination array is 307. Such proceeds exceed the winning combination array's initial assignment to the acceptable bid combination array which resulted in proceeds of 306. Thus, the winning candidate array will be overridden and reassigned to the current combination array 475.

To further demonstrate the sub-steps of step S365, FIG. 4N shows yet another alternative solution to the problem space 435. As shown in table 480, the proceeds of the current combination array of 306 does not exceed the proceeds of the winning combination array's subsequent assignment to the current combination array 475 of FIG. 4M, which resulted in proceeds of 307. Thus, the winning candidate array's assignment to the current combination array 475 of FIG. 4M will not be changed.

FIG. 4O shows the final optimized solution to the problem space 435 and winning candidate array. As seen in table 485, the proceeds of this current combination array is 392, and thus exceeds the winning combination array's subsequent assignment to the current combination array 475 of FIG. 4M. Thus, the setting of the winning candidate array will be overridden to the current combination array 485. Also shown in table 485, is the result of adding back the original bid arrays, assets, and awarded assets that were excluded from the iteration space during the pre-processing steps S310-S330, thereby obtaining a final result in terms of the original set of bid arrays.

Figure 5A:
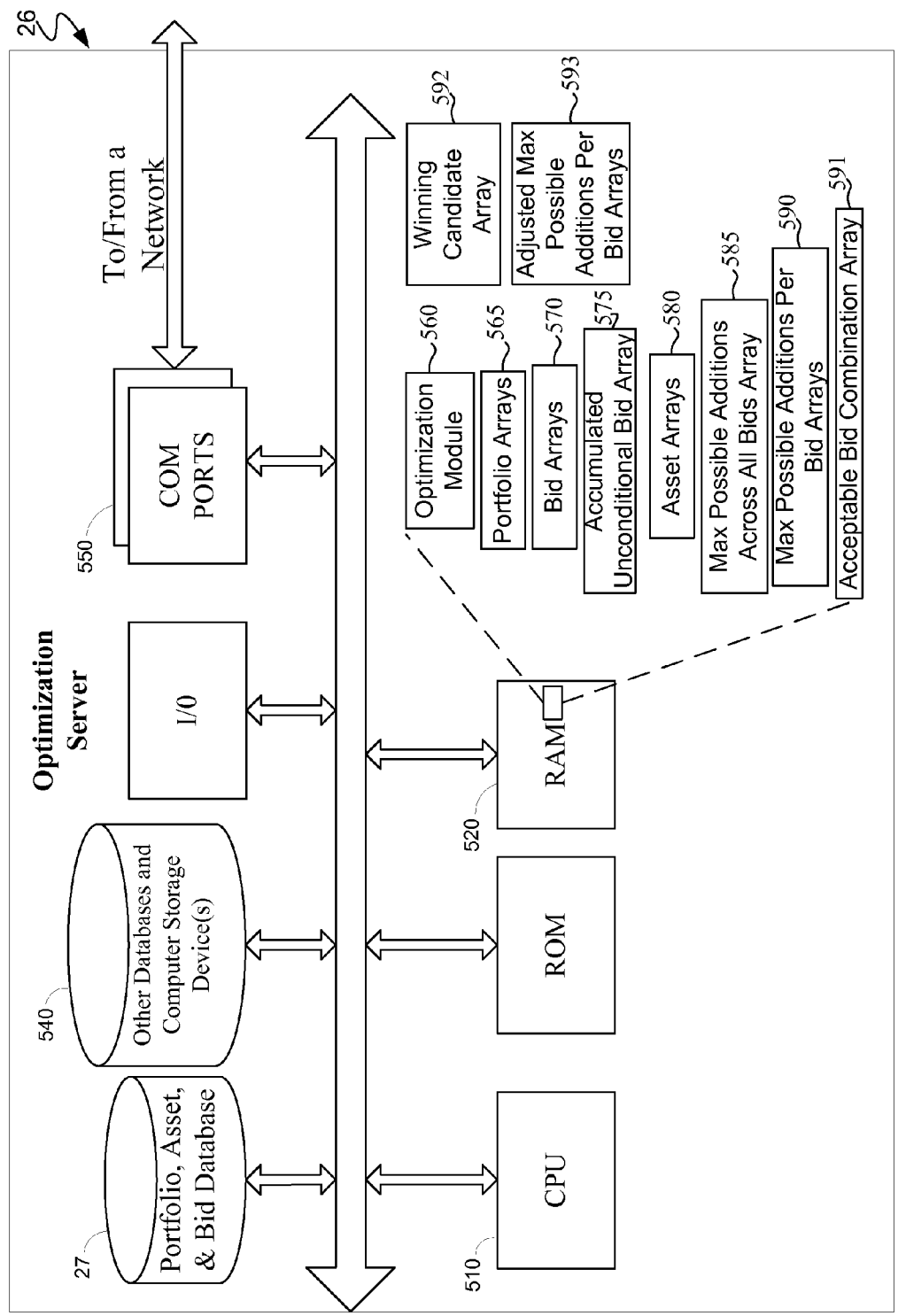
FIGS. 5A-B are simplified functional block diagrams of computers that may be configured as a server or host to function as any of the computing devices in FIG. 1, for example, the Optimization Server 26 and Portfolio, Asset, & Bid Server 25 shown in the system of FIG. 1.
Figure 5B:
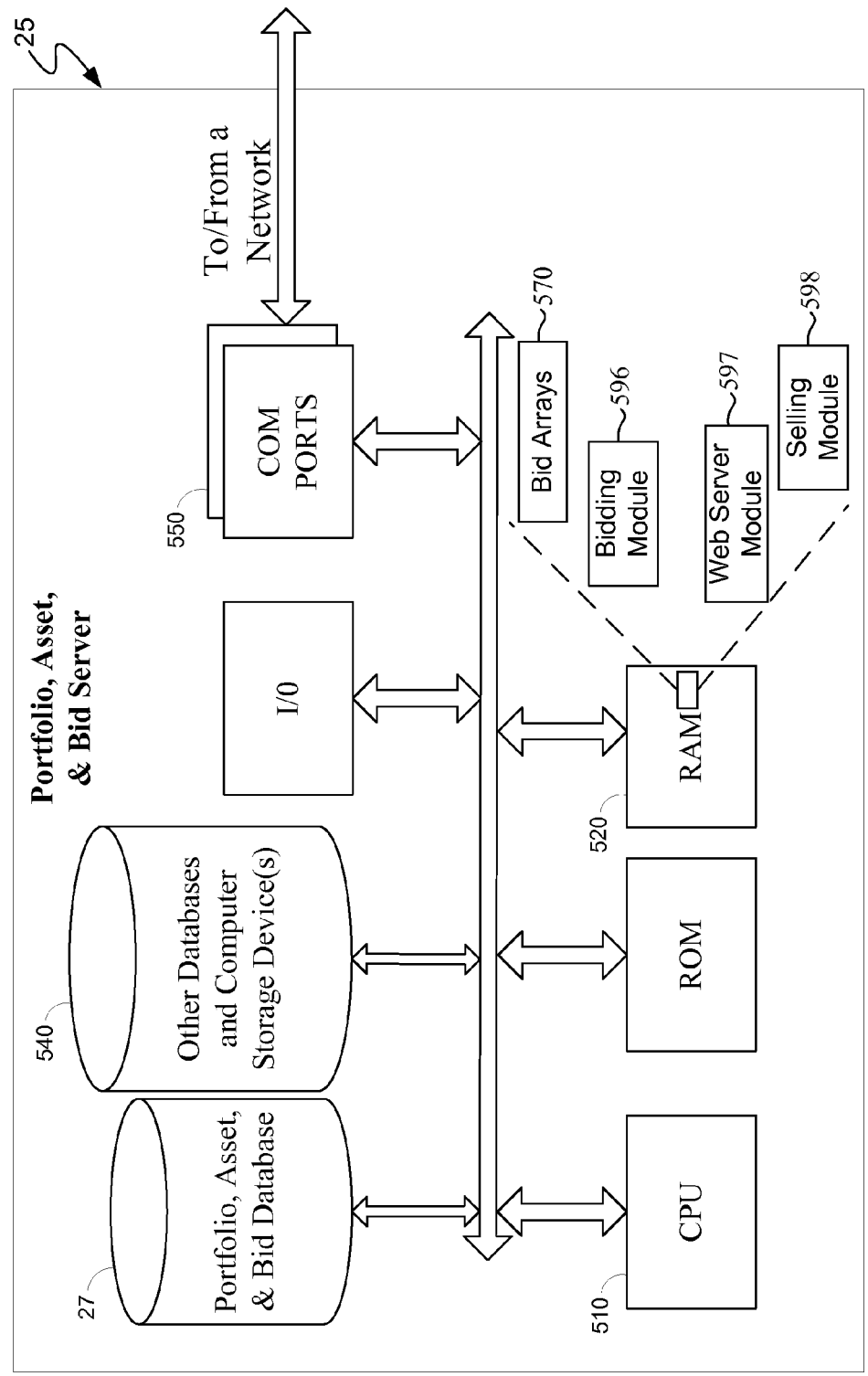

FIG. 5A is a simplified functional block diagram of a computer that may be configured as a server or host to function as any of the computing devices in FIG. 1, for example, the Optimization Server 26 shown in the system of FIG. 1. FIG. 5B shows the Portfolio, Asset, & Bid Server 25 of FIG. 1.

The Optimization Server 26 and Portfolio, Asset, & Bid Server 25 include a CPU 510, in the form of one or more processors, for executing program instructions. Although the processor(s) forming the CPU 510 may be similar to a microprocessor, host or server computer devices typically use somewhat different circuit architectures, e.g. to provide more processor power. Optimization Server 26 and Portfolio, Asset, & Bid Server 25 also include a memory 520, shown as RAM, that is accessible to the processor to execute various programming instructions. The memory 520 typically stores programming, such that execution of the programming by the processor 510 configures the Optimization Server 26 and Portfolio, Asset, & Bid Server 25 to perform the functions or procedures as described above. The server typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

In this particular example, the Optimization Server 26 and Portfolio, Asset, & Bid Server 25 are shown as including the Portfolio, Asset, & Bid Database 27, discussed earlier. The Portfolio, Asset, & Bid Database 27 is accessible to the central processing unit (CPU) 510 of the Optimization Server 26 and Portfolio, Asset, & Bid Server 25. Additional databases and computer storage device(s) 540 are also accessible, such as those storing related information about the portfolios, pools, and assets being offered for sale and profiles of the bidders and sellers, for example.

As outlined earlier, the bidding on individual assets within the portfolio/pool functionality is effectuated by the bidding module 596 and web server module 597 of the Portfolio, Asset, & Bid Server 25 in FIG. 5B and is typically invoked during interactions/communications exchanged with a bidder computing device 15B-N. The processing of a portfolio/pool sale with individual assets, a reserve price, and optional minimum/maximum constraints is handled by the selling module 598 and web server module 597 of the Portfolio, Asset, & Bid Server 25 in FIG. 5B, which are typically invoked during interactions/communications exchanged with a seller computing device 15A.

The system 5 of FIG. 1 also invokes the Optimization Server 26 to determine a high aggregate asset-level bid combination with optimized computer execution time. The exchanged data may be obtained in several different ways, including from the optimization module 560 of the Optimization Server 26 and bidding module 596 and web server module 597 of the Portfolio, Asset, & Bid Server 25.

For packet data communication, Optimization Server 26 and Portfolio, Asset, & Bid Server 25 include a data/network communication interface, shown generally as com ports 550. The com ports 550 may use any available data communication technology. In a fixed installation, for example, the com ports 550 may include an Ethernet interface card for communication over appropriate data network wiring. For a wireless implementation, the com ports 550 may include a WiFi transceiver. The com ports 550 allow the Optimization Server 26 and Portfolio, Asset, & Bid Server 25 to communicate with other devices and systems, including with each other and computing devices 15A-N.

In the illustration, Optimization Server 26 includes an optimization module 560 stored in RAM 520 to carry out steps in the procedures of FIGS. 2-3 and other functionality described herein. The Portfolio, Asset, & Bid Server 25 also includes a bidding module 596 and a web server module 597 that is stored in RAM 520 to carry out the steps of procedure of FIG. 2 and generate the graphical user interfaces of FIGS. 6-7 and other functionality described herein.

In general, the term "module," as used herein, refers to logic embodied in hardware, or software modules that are programming instructions (e.g., subroutines, procedures, or functions) written in a programming language, such as Java™, C, C++, C Sharp, PHP, HyperText Markup Language ("HTML"), JavaScript, or Perl, for example. A software module can be compiled into executable programs or written in interpreted programming languages, such as Perl or Visual Basic script. Software modules may be callable from other modules. Generally, the modules described herein refer to logical modules that may be merged with other modules or divided into sub-modules despite their physical organization. The modules can be stored in any type of computer readable medium or computer storage device (e.g., non-transitory computer readable media) and be executed by one or more processors of general purpose computers. In addition, the methods and processes disclosed herein can alternatively be embodied in specialized computer hardware or an application specific integrated circuit ("ASIC").

The optimization module 560 is tasked with determining a high aggregate combination of individual bids on the assets of the portfolio/pool with optimized computer performance. Bidding module 596 provides the bidding functionality on individual assets within a portfolio/pool, as discussed earlier and in FIGS. 6-7. Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

As shown in FIGS. 5A-B, the RAM 520 also stores a variety of data structures (e.g., linked lists or arrays) generated during the procedures of FIGS. 2-3. For example, the RAM 520 stores the portfolio arrays 565, bid arrays 570, accumulated unconditional bid array 575, asset arrays 580, maximum possible additions across all bids array 585, maximum possible additions per bid arrays 590, acceptable bid combination array 591, winning candidate array 592, and adjusted maximum possible additions arrays 593.

The instructions or programming may be used to implement any other device functions associated with the computer runtime optimization supporting asset-level bids on a portfolio with maximum and minimum constraints. Program aspects of the technology may be thought of as "products" or "articles of manufacture" typically in the form of executable code or process instructions and/or associated data that is stored on or embodied in a type of machine or processor readable medium (e.g., transitory or non-transitory), such as one of the memories 520, or a memory of a computer used to download or otherwise install such programming into the computing devices 15A-N or servers 25, 26, or a transportable storage device or a communications medium for carrying program for installation in the devices 15A-N and servers 25, 26.

FIG. 6 is a graphical user interface ("GUI") of bidding functionality that enables asset-level bids on a portfolio/pool with minimum and maximum constraints from a bidder's perspective. As shown, the GUI 600 includes a first GUI area 610 that allows the bidder to select a category of bidding that is "Asset Level Bids with Min/Max". The GUI 600 is provided by a bidding module 596 and web server module 597 of Portfolio, Asset, & Bid Server 25 and is generated based on data stored in the Portfolio, Asset, & Bid Database 27 that is linked to a portfolio/pool available for bidding.

The GUI 600 includes a second GUI area 620 that allows the user to select which assets to bid on. Once assets are selected, Portfolio, Asset, & Bid Server 25 opens the bidding in the enclosed third GUI area 630 where bid amounts either as a dollar value amount or percentage can be calculated. Of note, GUI 600 shows only three assets, but an actual portfolio/pool may contain any number of assets and any number of bids may be placed on these assets; tens of thousands of assets is typical and thousands of bids may be placed on each asset. To the extent that the number of assets is sufficiently high such that manually entering of each individual bid is not practical, an integrated, uploadable spreadsheet can be provided and submitted through the GUI 600. When the bidder places bids via the GUI 600, bid arrays or other data structures representing the bids and bid amounts are stored in the Portfolio, Asset, & Bid Database 27 by Portfolio, Asset, & Bid Server 25 in response to receiving the placed bids.

As shown, the GUI 600 includes a fourth GUI area 640 for imposing minimum and maximum constraints 640. When such constraints are imposed, the constraints are stored in the bid array in the Portfolio, Asset, & Bid Database 27 by the Portfolio, Asset, & Bid Server 25. The minimum and maximum limitations are entered in the fourth GUI area 640 and, in the example, the minimum constraint indicates the bid array is only valid if an award of at least $400,000 is provided. The maximum constraint indicates the bid is only valid if an award of no more than $800,000 is provided.

Although not shown in GUI 600, the seller of the portfolio/pool also has the ability to put minimum and maximum thresholds. For example, a seller may prefer to sell at a minimum of $25 million increments for a large sale, or the seller may not allow a minimum award price. As another example, if the seller only wants to sell to a few parties, the seller can set the minimum award to be a higher amount, for example, $100 million. The means that each bidder would be unable to set a minimum bid less than the established baseline. The seller can use this mechanism to control the number of potential counterparties, as well as control the size/number of prospective buyers, where the buyer is a bidder that wins the auction.

FIG. 7 is graphical user interface ("GUI") of bidding functionality that enables bidding on multiple pools with minimum and maximum constraints from a bidder's perspective. As shown, the GUI 700 includes a first GUI area 710 that allows the bidder to select a category of bidding that is "Multi Pool Bids with Min/Max" award restrictions entered by the bidder. The GUI 700 is provided by a bidding module 596 and web server module 597 of the Portfolio, Asset, & Bid Server 25 and is generated based on data stored in the Portfolio, Asset, & Bid Database 27 that is linked to a portfolio/pool available for bidding.

The GUI 700 includes a second GUI area 720 that allows the bidder to select which pools to bid on. In response to the selection, Portfolio, Asset, & Bid Server 25 opens in the GUI 700 a third GUI area 730 where bids amounts can be calculated as either a dollar value amount or percentage. When the bidder places bids via the GUI 700, a pool array or other data structures representing the bid amount are stored in the Portfolio, Asset, & Bid Database 27. The pool array has a similar structure as the bid array described above, but each element of the pool array corresponds to a bid on a separate pool within a portfolio. Similar to the bid array, the pool array may include minimum and maximum constraints across all the pool-level bids of the portfolio.

The GUI 700 includes a fourth GUI area 740 that allows minimum and maximum constraint limitations to be entered. When such constraints are imposed, the constraints are stored in the pool array in the Portfolio, Asset, & Bid Database 27 by the Portfolio, Asset, & Bid Server 25. In the exemplary fourth GUI area 740, this pool array is only valid if the pool array is awarded at least $1,000,000 but no more than $5,000,000. Although not shown, the seller of the portfolio/pool has the ability to put minimum and maximum thresholds.

Upon receiving asset-level or pool-level bids via the GUIs of FIGS. 6-7, the servers 25, 26 determine a high aggregate combination of bids across the individual assets/pools of the portfolio considering any minimum and maximum constraints. As noted above, because hundreds or thousands of bids on 10,000 assets can be received, the system reduces the iteration space size and thus achieves optimal computer performance, including enhanced runtime and memory usage.

Aspects of the methods of processing asset-level bids on a portfolio with computer runtime optimizations may be embodied in programming, for example, for one or more servers 25, 26 and/or computing devices 15A-N. Program aspects of the technology may be thought of as "products" or "articles of manufacture" typically in the form of executable code and/or associated data that is carried on or embodied in a type of machine readable medium. Executable code, for example, may take the form of software, firmware, microcode or the like of a type suitable for execution by the particular processor hardware of the computing devices 15A-N and servers 25, 26 so as to configure the respective equipment to perform functions like those discussed herein.

"Storage" type media include any or all of the tangible memory of the computers, servers, processors or the like, or associated modules thereof, such as various semiconductor memories, tape drives, disk drives and the like, which may provide non-transitory storage at any time for the programming. All or portions of the programming may at times be communicated through the Internet or various other telecommunication networks. Such communications, for example, may enable loading of the software or modules from one computer or processor into another, for example, from a management server or host computer of the carrier, such as servers 25, 26, onto the computing devices 15A-N. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, "tangible" or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s), computing devices or the like, such as may be used to implement the secure payment processing techniques discussed herein. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less all features of a single disclosed embodiment. Thus the following claims are hereby incorporated into the Detailed Description, with each claim standing on its own as a separately claimed subject matter.

What is claimed is:

1. A system comprising:
   (a) a portfolio, asset, and bid computer server including:
      a first network communication interface;
      a first processor;
      a first memory accessible to the processor; and
      first programming in the first memory comprising software modules, including a selling software module and a bidding software module, wherein execution of the first programming by the first processor configures the portfolio, asset, and bid computer server to perform functions, including functions to:
         receive, via the selling software module, a first communication data transmitted from a seller computing device via a network, the first communication data indicating a portfolio having a plurality of individual assets for sale;
         in response to receiving the first communication data, store the first communication data indicating the portfolio having the plurality of individual assets for sale in a database;
         receive, via the bidding software module, a second communication data from each of a plurality of bidder computing devices through the network, the second communication data received from each bidder computing device indicating a bid on one or more of the individual assets of the portfolio from a respective bidder, each bid including:
            one or more separate bid amounts for each individual asset of the portfolio,
            a minimum constraint that specifies a minimum purchase amount across all of the individual assets for sale in the portfolio issued by the respective bidder, and
            a maximum constraint that specifies a maximum purchase amount across all of the individual assets for sale in the portfolio issued by the respective bidder;
         in response to receiving the second communication data from each of the plurality of bidder computing devices, store the bid in the database; and
         after storing the first communication data indicating the portfolio having the plurality of individual assets for sale from the seller computing device and the second communication data indicating the bid from each of the plurality of bidder computing devices, receive, via the selling software module, a query from the seller computing device for an aggregate combination of bids on the plurality of individual asset of the portfolio;
   (b) an optimization computer server including:
      a second network communication interface;
      a second processor;
      a second memory accessible to the processor; and
      second programming in the second memory comprising software modules, including an optimization software module, wherein execution of the second programming by the second processor configures the optimization computer server to perform functions, including functions to:
         in response to the query for the aggregate combination of bids, determine, via the optimization software module, the combination of bids subject to the minimum and maximum constraints of the bids by:

retrieving from the database and then storing in the second memory a portfolio array including M number of elements, each portfolio array element corresponding to a bid array of bids on the plurality of individual assets of the portfolio, wherein each bid array includes N number of elements, each bid array element corresponding to a bid amount on one of the plurality of individual assets in the portfolio, the minimum constraint, and the maximum constraint; and reducing a size of an iteration space to determine the aggregate combination by generating an accumulated unconditional bid array that selects the maximum bid amount for each individual asset of the portfolio from a plurality of unconditional bid arrays, wherein each unconditional bid array imposes no minimum or maximum constraints;

(c) a secure local area network coupled to the portfolio, asset, and bid computer server and the optimization computer server to provide communications for the portfolio, asset, and bid computer server and the optimization computer server, including communications between the portfolio, asset, and bid computer server and the optimization computer server;

(d) a firewall coupled to the secure local area network to provide a communication gateway to a wide area network serving the seller computing device and the plurality of bidder computing devices that are configured as clients of one or both of the portfolio, asset, and bid computer server and the optimization computer server; and (e) wherein the database is contained in a non-transitory storage device accessible to the first processor of the portfolio, asset, and bid computer server and the second processor of the optimization computer server, the database comprising a database structure for the first communication data indicating the portfolio having the plurality of individual assets for sale from the seller computing device and the second communication data indicating the bid from each of the plurality of bidder computing devices.

2. The system of claim 1, wherein execution of the second programming by the second processor configures the optimization computer server to perform further functions to:

when selecting the maximum bid amount for each individual asset, sort the bid amount of the plurality of unconditional bid arrays on each individual asset in descending order, thereby determining the maximum bid amount of each individual asset.

3. The system of claim 2, wherein execution of the second programming by the second processor configures the optimization computer server to perform further functions to:

when selecting the maximum bid amount for each individual asset, link a corresponding entry for the individual asset in the accumulated unconditional bid data array to a first unconditional bid array having the maximum bid amount, the first unconditional bid array in the plurality of unconditional bid arrays; and subsequently exclude the first unconditional bid array from processing.

4. The system of claim 3, wherein execution of the second programming by the second processor configures the optimization computer server to perform further functions to:

when determining, via the optimization software module, the combination of bids subject to the minimum and maximum constraints of the bids:

reduce the size of the of the iteration space by excluding a conditional bid array of a plurality of bid arrays, wherein the conditional bid array includes minimum or maximum constraints, and the bid amount of each bid array element in the conditional bid array is less than a corresponding bid amount of each bid array element in the accumulated unconditional bid array.

5. The system of claim 4, wherein execution of the second programming by the second processor configures the optimization computer server to perform further functions to:

when determining whether to exclude the conditional bid array after generating the accumulated unconditional bid array, check each remaining bid array that is not combined into the accumulated unconditional bid array against the accumulated unconditional bid array on an element-by-element basis.

6. The system of claim 5:

wherein execution of the first programming by the first processor configures the portfolio, asset, and bid computer server to perform further functions to:

receive, via the selling software module, a reserve price transmitted from the seller computing device via the network that specifies a lower bid amount on a first asset of the plurality of individual assets in the portfolio that must be achieved for the first asset to be sold; and in response to receiving the reserve price, store the reserve price with the plurality of individual assets of the portfolio in the database; and wherein execution of the second programming by the second processor configures the optimization computer server to perform further functions to:

subsequent to receiving and storing the reserve price in the database, reduce the size of the iteration space, via the optimization software module, by excluding from processing a first element corresponding to the first asset in the plurality of bid arrays that is less than the reserve price for the first asset of the portfolio.

7. The system of claim 6, wherein execution of the second programming by the second processor configures the optimization computer server to perform further functions to:

reduce the size of the iteration space by excluding a second asset from processing that has received no bid amount in a second element corresponding to the second asset in each of the plurality of bid arrays.

8. The system of claim 7, wherein execution of the second programming by the second processor configures the optimization computer server to perform further functions to:

reduce the size of the iteration space by:

determining a third asset of the plurality of individual assets in the accumulated unconditional bid array received a placed bid amount in a third element corresponding to the third asset in the accumulated unconditional bid array; and determining each remaining bid array that is not combined into the accumulated unconditional bid array received no bid amount in the third element corresponding to the third asset; and subsequently assigning the third asset to the third element corresponding to the third asset in the accumulated unconditional bid array.

9. The system of claim 8, wherein execution of the second programming by the second processor configures the optimization computer server to perform further functions to:
generate a set of asset arrays that sort the bid amount of the plurality of bid arrays that remain in the iteration space on each individual asset of the portfolio that remains in the iteration space in descending order; and
link each asset array element of the set of asset arrays back to a corresponding bid array in the plurality of bid arrays that remain.

10. The system of claim 9, wherein execution of the second programming by the second processor configures the optimization computer server to perform further functions to:
upon generating the set of asset arrays, iterate over each asset array and assign each individual asset to an asset array element with a highest bid amount that satisfies the maximum and minimum constraints of the linked bid array of the asset array element.

11. The system of claim 10, wherein execution of the second programming by the second processor configures the optimization computer server to perform further functions to:
upon finding a violation of the maximum constraint of a first linked bid array with a first highest bid amount, assigning the individual asset to a second asset array element with a second linked bid array having a second highest bid amount.

12. The system of claim 11, wherein execution of the second programming by the second processor configures the optimization computer server to perform further functions to:
upon finding a violation of the minimum constraint of the second linked bid array, assigning the individual asset to a third asset array element with a third linked bid array having a third highest bid amount.

13. The system of claim 12, wherein execution of the second programming by the second processor configures the optimization computer server to perform further functions to:
iterate through the entire set of asset arrays and check for the violation of the maximum constraint of the linked bid arrays, prior to checking for the violation of the minimum constraint of the linked bid arrays.

14. The system of claim 13, wherein execution of the second programming by the second processor configures the optimization computer server to perform further functions to:
upon completion of iterating through the set of asset arrays and checking for the violations of minimum and maximum constraints of the linked bid arrays, store the assigned asset array elements with the linked bid arrays as an acceptable bid combination array in the database.

15. The system of claim 14, wherein execution of the second programming by the second processor configures the optimization computer server to perform further functions to:
generate a maximum possible additions across all bids array listing a sum of maximum bids for asset elements with an index greater or equal to a current asset's index; and
generate a maximum possible additions array for each bid array including the sum of maximum bids for asset elements with an index greater or equal to the current asset's index in each bid array.

16. The system of claim 15, wherein execution of the second programming by the second processor configures the optimization computer server to perform further functions to:
set a winning candidate array to the acceptable bid combination array; and
traverse the set of asset arrays from largest to smallest comparing each bid amount to each element of the winning candidate array.

17. The system of claim 16, wherein execution of the second programming by the second processor configures the optimization computer server to perform further functions to:
when traversing the set of asset arrays:
determine whether proceeds of the winning candidate array can be exceeded by generating a current combination array and checking the current combination array against the maximum possible additions across all bids array; and
when a sum of elements of the current combination array added to the maximum possible additions array across all bids array from a current asset onwards is less than proceeds generated by elements of the winning candidate array, discard the current combination array.

18. The system of claim 17, wherein execution of the second programming by the second processor configures the optimization computer server to perform further functions to:
upon moving to another asset to generate the current combination array, check for a critical asset that causes the bid array to reach the minimum constraint of the bid array;
upon finding the critical asset, determining the critical asset is critical to two or more bid arrays;
upon determining the critical asset is critical to two or more bid arrays, backtracking to a state of the current combination array where the critical asset is critical to only one bid array;
upon backtracking to the state of the current combination array where the critical asset is critical to only one bid array, assigning the critical asset to the only one bid array; and
each time the current combination array exceeds the winning candidate array and satisfies the maximum and minimum constraints of the plurality of bid arrays, reassign the winning candidate array to the current combination array.

19. A server including:
a network communication interface;
a processor;
a memory accessible to the processor; and
programming in the memory comprising modules, including a selling module, a bidding module, and an optimization module, wherein execution of the programming by the processor configures the server to perform functions, including functions to:
receive, via the selling module, a first communication data transmitted from a seller computing device via a network, the first communication data indicating a portfolio having a plurality of individual assets for sale;
in response to receiving the first communication data, store the first communication data indicating the portfolio having the plurality of individual assets for sale in a database;
receive, via the bidding module, a second communication data from each of a plurality of bidder computing devices through the network, the second communication data indicating a bid on one or more of the individual assets of the portfolio from a respective bidder, each bid including:
one or more separate bid amounts for each individual asset of the portfolio,
a minimum constraint that specifies a minimum purchase amount across all of the individual assets for sale in the portfolio issued by the respective bidder, and
a maximum constraint that specifies a maximum purchase amount across all of the individual assets for sale in the portfolio issued by the respective bidder;
in response to receiving the second communication data from each of the plurality of bidder computing devices, store the bid in the database;
after storing the first communication data indicating the portfolio having the plurality of individual assets for sale from the seller computing device and the second communication data indicating the bid from each of the plurality of bidder computing devices, receive, via the selling module, a query from the seller computing device for an aggregate combination of bids on the plurality of individual asset of the portfolio; and
in response to the query for the aggregate combination of bids, determine, via the optimization module, the combination of bids subject to the minimum and maximum constraints of the bids by:
retrieving from the database and then storing in the memory a portfolio linked list including M number of elements, each portfolio linked list element corresponding to a bid linked list of bids on the plurality of individual assets of the portfolio, wherein each bid linked list includes N number of elements, each bid linked list element corresponding to a bid amount on one of the plurality of individual assets in the portfolio, the minimum constraint, and the maximum constraint, and
reducing a size of an iteration space to determine the aggregate combination by generating an accumulated unconditional bid linked list that selects the maximum bid amount for each individual asset of the portfolio from a plurality of unconditional bid linked lists, wherein each unconditional bid linked list imposes no minimum or maximum constraints.

20. A server including:
a network communication interface;
a processor;
a memory accessible to the processor; and
programming in the memory comprising modules, including a selling module, a bidding module, and an optimization module, wherein execution of the programming by the processor configures the server to perform functions, including functions to:
receive, via the selling module, a first communication data transmitted from a seller computing device via a network, the first communication data indicating a portfolio having a plurality of individual assets for sale;
in response to receiving the first communication data, store the first communication data indicating the portfolio having the plurality of individual assets for sale in a database;
receive, via the bidding module, a second communication data from each of a plurality of bidder computing devices through the network, the second communication data indicating a bid on one or more of the individual assets of the portfolio from a respective bidder, each bid including:
one or more separate bid amounts for each individual asset of the portfolio,
a minimum constraint that specifies a minimum purchase amount across all of the individual assets for sale in the portfolio issued by the respective bidder, and
a maximum constraint that specifies a maximum purchase amount across all of the individual assets for sale in the portfolio issued by the respective bidder;
in response to receiving the second communication data from each of the plurality of bidder computing devices, store the bid in the database;
after storing the first communication data indicating the portfolio having the plurality of individual assets for sale from the seller computing device and the second communication data indicating the bid from each of the plurality of bidder computing devices, receive, via the selling module, a query from the seller computing device for an aggregate combination of bids on the plurality of individual asset of the portfolio; and
in response to the query for the aggregate combination of bids, determine, via the optimization module, the combination of bids subject to the minimum and maximum constraints of the bids by:
retrieving from the database and then storing in the memory a portfolio array including M number of elements, each portfolio array element corresponding to a bid array of bids on the plurality of individual assets of the portfolio, wherein each bid array includes N number of elements, each bid array element corresponding to a bid amount on one of the plurality of individual assets in the portfolio, the minimum constraint, and the maximum constraint, and
reducing a size of an iteration space to determine the aggregate combination by generating an accumulated unconditional bid array that selects the maximum bid amount for each individual asset of the portfolio from a plurality of unconditional bid arrays, wherein each unconditional bid array imposes no minimum or maximum constraints.

* * * * *